United States Patent
Hoke et al.

(10) Patent No.: US 9,073,408 B2
(45) Date of Patent: Jul. 7, 2015

(54) REGISTER VANE AIR DEFLECTOR AND METHOD

(75) Inventors: Paul Bryan Hoke, Plymouth, MI (US); John Bratcher, Ypsilanti Township, MI (US); Ronald Dickson, Belle River (CA)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 13/346,184

(22) Filed: Jan. 9, 2012

(65) Prior Publication Data

US 2013/0178141 A1    Jul. 11, 2013

(51) Int. Cl.
*B60H 1/00* (2006.01)
*B60H 1/26* (2006.01)
*B60H 1/34* (2006.01)
*F24F 13/08* (2006.01)

(52) U.S. Cl.
CPC ............ *B60H 1/3414* (2013.01); *F24F 13/084* (2013.01); *F24F 13/082* (2013.01)

(58) Field of Classification Search
CPC ...... B60H 1/34; B60H 1/3414; B60H 1/3421; B60H 1/24; F24F 13/082; F24F 13/084
USPC .......................................... 454/141, 154, 155
See application file for complete search history.

(56) References Cited

U.S. PATENT DOCUMENTS

| 4,699,322 | A | * | 10/1987 | Jobst | 239/503 |
| 5,709,602 | A | * | 1/1998 | Onodera | 454/155 |
| 5,890,958 | A | * | 4/1999 | Greiner et al. | 454/155 |
| 7,238,103 | B2 | * | 7/2007 | Terai et al. | 454/155 |
| 7,470,178 | B2 | | 12/2008 | Tajiri | |
| 7,566,261 | B2 | * | 7/2009 | Ono et al. | 454/155 |
| 7,887,400 | B2 | * | 2/2011 | Shibata et al. | 454/155 |
| 2004/0002298 | A1 | * | 1/2004 | Osada et al. | 454/155 |
| 2004/0219874 | A1 | * | 11/2004 | Karadia | 454/155 |
| 2008/0146139 | A1 | * | 6/2008 | Terai et al. | 454/155 |
| 2010/0093269 | A1 | * | 4/2010 | Sakaguchi et al. | 454/154 |
| 2010/0124876 | A1 | * | 5/2010 | Yu et al. | 454/155 |
| 2010/0130115 | A1 | * | 5/2010 | Miki | 454/155 |
| 2013/0029577 | A1 | * | 1/2013 | Kim | 454/155 |

FOREIGN PATENT DOCUMENTS

| EP | 0899136 A1 | 3/1999 |
| EP | 1580053 A1 | 9/2005 |
| GB | 2292797 A | 6/1996 |
| JP | 2000255255 A | 9/2000 |

* cited by examiner

*Primary Examiner* — Steven B McCallister
*Assistant Examiner* — Jonathan Cotov
(74) *Attorney, Agent, or Firm* — Vichit Chea; Price Heneveld LLP

(57) ABSTRACT

A heating, ventilation, and air conditioning register for use in an automotive vehicle has a hollow housing having an inlet, an outlet, and an inner housing wall. A plurality of pivotable vanes are disposed proximate the outlet, including an outermost vane disposed proximate the inner housing wall that is pivotable to an extreme position. A deflector is disposed between the inner housing wall and the outermost vane, such that the deflector substantially blocks airflow between the inner housing wall when the outermost vane is in the extreme position.

16 Claims, 4 Drawing Sheets

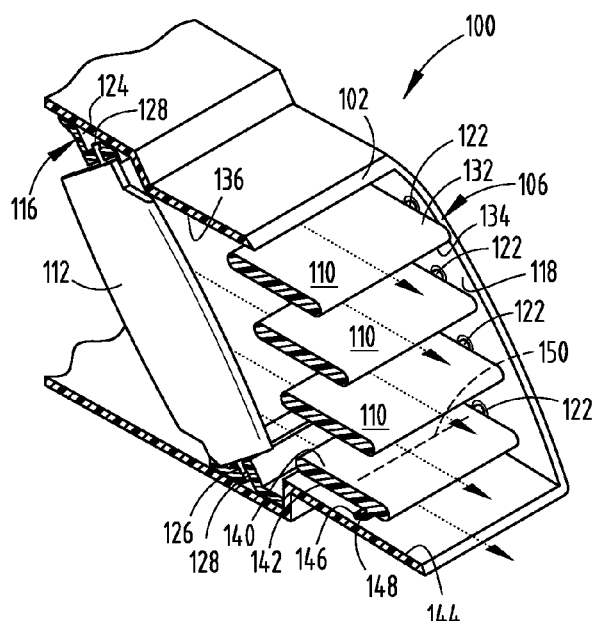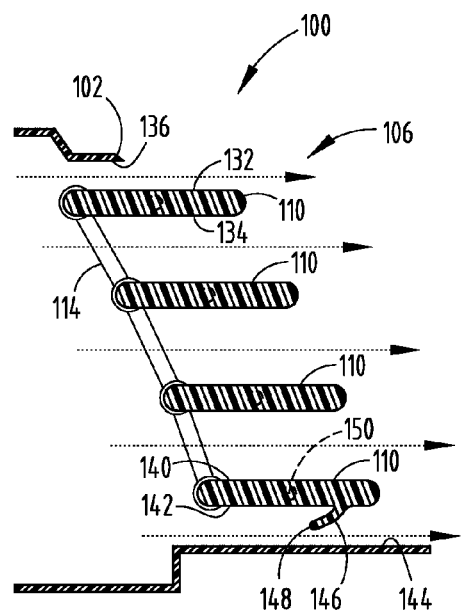
FIG. 5  FIG. 5A
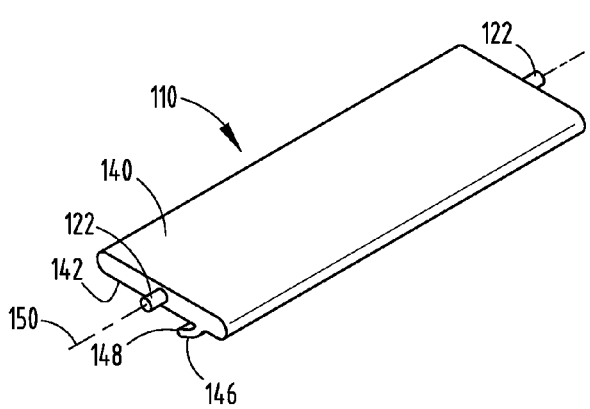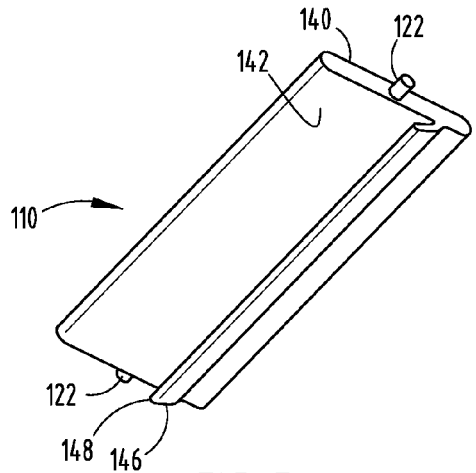
FIG. 6  FIG. 7
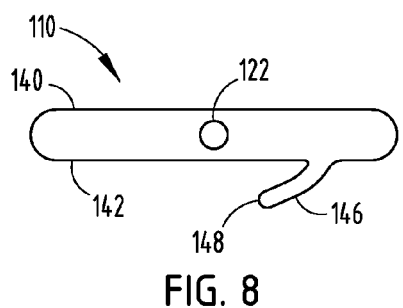
FIG. 8

US 9,073,408 B2

REGISTER VANE AIR DEFLECTOR AND METHOD

FIELD OF THE INVENTION

The present invention generally relates to an air deflector for heating, ventilation, and air conditioning registers for use in an automotive vehicle, and more particularly relates to an adjustable air deflector that provides superior airflow range and efficiency.

BACKGROUND OF THE INVENTION

Heating, ventilation, and air conditioning registers are typically used in automotive vehicles, particularly in the dashboard of passenger vehicles, to deliver and direct a controlled quantity of heated, ambient, or cooled air to the vehicle occupants. Such registers, usually arranged traversely along the width of the dashboard, are often provided with moveable vanes that may be adjusted side-to-side and/or up and down to direct the airflow as desired by a vehicle occupant. Optimal register function is to provide as much directional range to the airflow as possible. Ideally, the airflow should be capable of being aimed between included angles ranging above an occupant's head down to the lap vertically and off the left side of the body to off of the right side of the body horizontally. An additional consideration is the total amount of airflow that the register can deliver, and it is generally considered desirable to create as little obstruction to the overall airflow as possible, for example, by using as few vanes in the horizontal and vertical directions as possible. Yet another consideration is that register design is highly constrained by vehicle packaging and styling. In view of these considerations, the airflow efficiency of prior registers, particularly in the extreme downward direction, was discovered to be deficient and improvement was sought.

SUMMARY OF THE INVENTION

One aspect of the present invention includes a hollow tubular housing having an inlet, an outlet, and an inner housing wall. A plurality of pivotable vanes are disposed proximate an outlet, including an outermost vane disposed proximate an inner housing wall that is pivotable to an extreme position. A deflector is disposed between the inner housing wall and the outermost vane, the deflector substantially blocking airflow between the inner housing wall when the outermost vane is in the extreme position.

Another aspect of the present invention includes a housing having an inlet, an outlet, and an inner wall. A plurality of vanes are pivotably disposed within the outlet between an extreme upward position to direct airflow upwardly, an extreme downward position to direct airflow downwardly, and intermediate neutral positions. A deflector is disposed between an inner lower wall and an outermost lower vane and substantially blocks airflow between the inner lower wall and the outermost lower vane in the downward position without substantially blocking airflow between the inner lower wall and the outermost lower vane in the intermediate neutral positions.

Yet another aspect of the present invention includes a method for directing airflow through an automotive vehicle air vent housing having an inlet, an outlet, and an inner wall. The method includes pivotably disposing a plurality of vanes at the outlet, including an outermost vane disposed proximate an inner wall having an extreme position. The method also includes the step of positioning a deflector between the inner wall and the outermost vane to substantially block airflow between the inner wall and the outermost vane in the extreme position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a cross-sectional perspective view of an embodiment of the heating, ventilation, and air conditioning register of the present disclosure in the neutral position;

FIG. 5A is a cross-sectional view of an embodiment of the heating, ventilation, and air conditioning register of FIG. 5;

FIG. 6 is a top perspective view of an embodiment of the vane of the heating, ventilation, and air conditioning register of the present disclosure;

FIG. 7 is a bottom perspective view of an embodiment of the vane of the heating, ventilation, and air conditioning register of the present disclosure;

FIG. 8 is a right side elevational view of an embodiment of the vane of the heating, ventilation, and air conditioning register of the present disclosure;

DETAILED DESCRIPTION OF THE PREFERRED EMBODIMENTS

Figure 1:
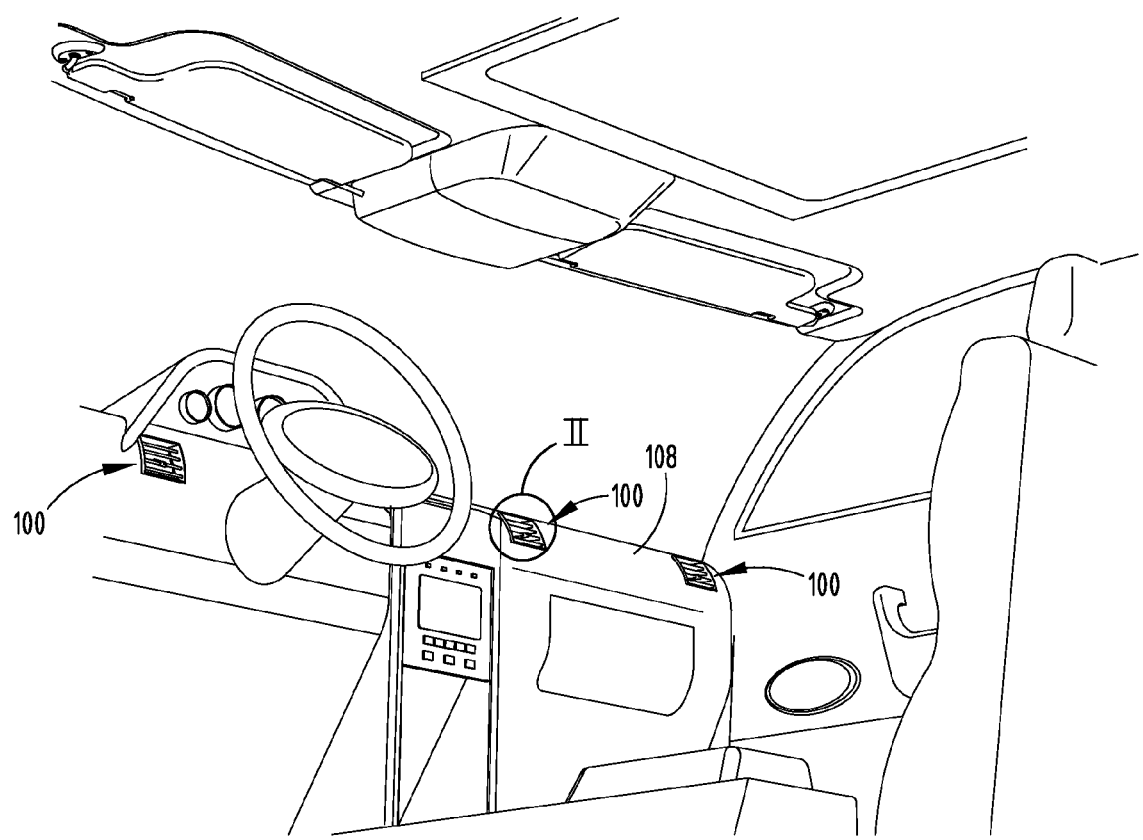
FIG. 1 is a perspective view of a vehicle incorporating an embodiment of the heating, ventilation, and air conditioning register of the present disclosure.
Figure 2:
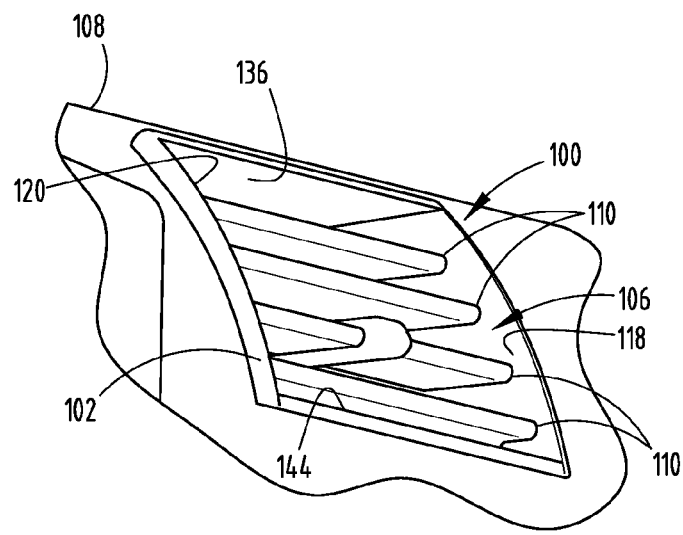
FIG. 2 is a perspective view of an embodiment of the heating, ventilation, and air conditioning register of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the Figures, the reference numeral 100 generally designates a heating, ventilation, and air conditioning register that includes a substantially rectangular hollow housing 102 having an inlet 104 and an outlet 106. While the register housing 102 preferably has a rectangular configuration, other configurations, such as circular or oval configurations, can be used to obtain the improved register aiming function of the present disclosure.

As is known, air is forced from a plenum through ductwork by a fan (not shown) to one of several registers 100 situated traversely along the width of the dashboard 108. Air from the plenum may be selectively delivered at heated, cooled, or at ambient temperatures as dictated by the needs of the vehicle occupant. Each register 100 is provided with a plurality of horizontally oriented vanes 110 and vertically oriented vanes 112. Each of the plurality of horizontally oriented vanes 110 are mechanically coupled one to the other by a linkage 114, and each of the vertically oriented vanes 112 are mechanically coupled one to the other by a linkage 116. The plurality of horizontally oriented vanes 110 are mounted to a pair of vertical inner walls 118, 120 that extend up the height of the register housing 102 at pivots 122, and the vertically oriented vanes 112 are mounted to a pair of mounts 124, 126 that extend across the width of the register housing 102 at pivots 128.

Thus, the horizontally oriented vanes 110 and the vertically oriented vanes 112 may be adjusted from side-to-side and/or up and down, respectively, in unison to direct airflow as desired by a vehicle occupant. This provides the optimal register function of maximum directional range to the airflow, ideally, where the airflow is capable of being aimed between included angles ranging above an occupant's head down to the lap vertically and off the left side of the body to off the right side of the body horizontally.

Figure 3:
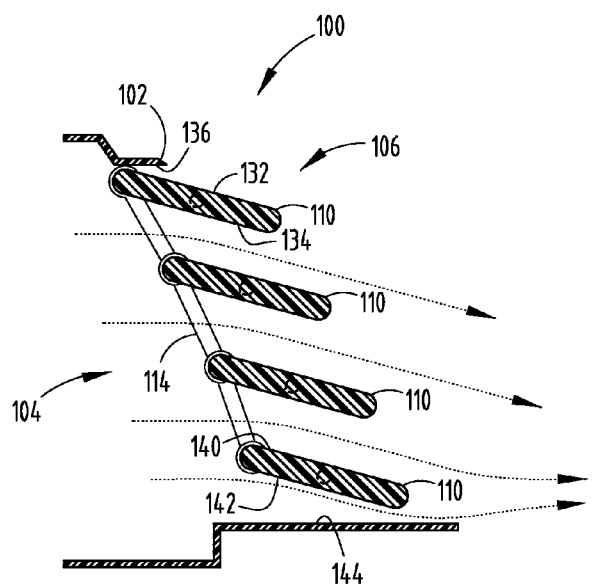
FIG. 3 is a cross-sectional side view of an example of a prior art heating, ventilation, and air conditioning register in the extreme downward position.
Figure 3A:
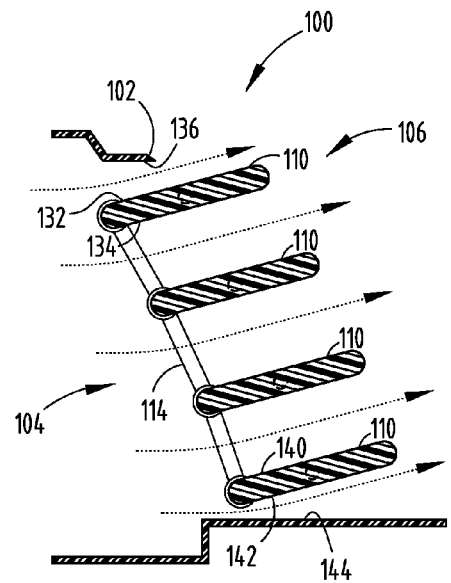
FIG. 3A is a cross-sectional side view of an example of a prior art heating, ventilation, and air conditioning register in the extreme upward position.

As shown in FIGS. 3, 3A, 4, 4A, 5, and 5A, the plurality of horizontally oriented vanes 110 have an extreme upwardly position to direct airflow upwardly, an extreme downward position to direct airflow downwardly, and plurality of intermediate neutral positions in between the two extreme positions. As a consequence of vehicle packaging and styling considerations, as shown in FIG. 3A, when the plurality of horizontally oriented vanes 110 are in the extreme upward position, the outermost upper vane 110, having an upper surface 132 and a lower surface 134, is rotated such that the airflow is located proximate the outside of the outlet 106 of the housing 102 before it encounters the upper surface 132. The upper surface 132 of the outermost upper vane 110 thus deflects the airflow exiting the register 100 between the upper surface 132 and the upper inner wall 136 of the housing 102 in the upward direction, and is added to the upwardly flowing airflow exiting the housing between the other vanes without disturbing the overall upward momentum of the airflow.

As further shown in FIG. 3, when the plurality of horizontally oriented vanes 110 are in the extreme downward position, the outermost lower vane 110, also having an upper surface 140 and lower surface 142, is rotated downwardly. The airflow thus encounters the lower surface 142 of the outermost lower vane substantially before exiting the outlet 106 and within the housing 102. The lower surface 142 of the outermost lower vane 130 is thus unable to effectively deflect the airflow exiting the register 100 between the lower surface 142 and the upper inner wall 144 of the housing 102 in the downward direction. The effect is that the airflow exiting the register 100 between the lower surface 142 and the lower inner wall 144 of the housing 102 has a momentum coincident with the surface of the lower inner wall 144 and is not added to the downwardly flowing airflow exiting the housing between the other vanes. In fact, the lowest airflow stream disturbs and reduces the overall downward momentum of the airflow, making it more difficult to achieve airflow targets near the extreme downward position of the plurality of horizontal vanes 110.

Figure 4:
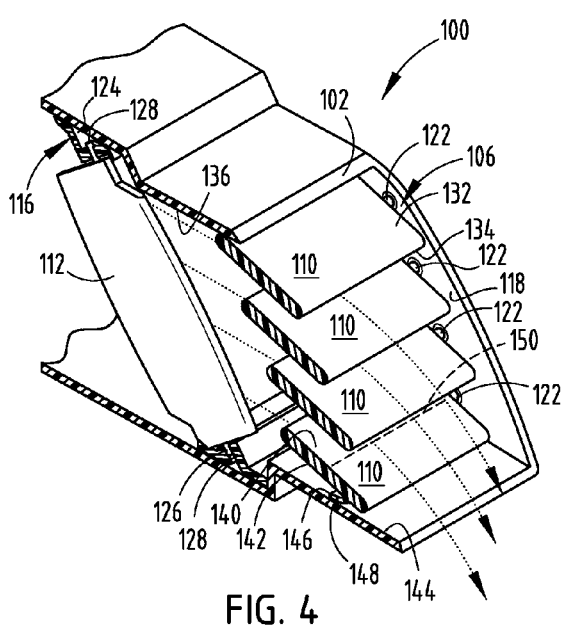
FIG. 4 is a cross-sectional perspective view of an embodiment of the heating, ventilation, and air conditioning register of the present disclosure in the extreme downward position.
Figure 4A:
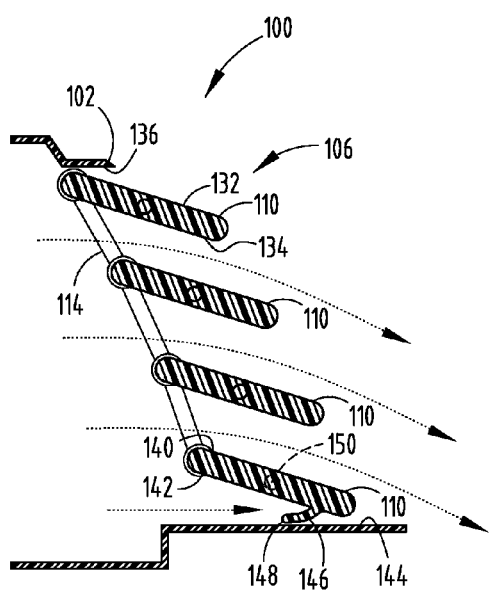
FIG. 4A is a cross-sectional side view of the embodiment of the heating, ventilation, and air conditioning register of FIG. 4.

In order to prevent this reduction in downward airflow, a deflector 146 is disposed between the lower inner wall 144 and the lower surface 142 of the outermost lower vane 110, as shown in FIGS. 4, 4A, 5 and 5A. The deflector 146 substantially blocks airflow between the lower inner wall 144 and the outermost lower vane 110 in the extreme downward position, so that the overall downward momentum of the airflow exiting the register 110 is not significantly reduced, as best shown in FIG. 4A.

Preferably, the deflector 146 comprises a curvilinear protuberance 148 mounted to the lower surface 142 of the outermost lower vane 110 longitudinally along the pivot axis 150 of the outermost lower vane 110, as shown in FIG. 4, and extends downwardly and inwardly toward the lower inner wall 144. Since an important consideration in register design is the total amount of airflow that the register can deliver, it is generally considered desirable to create as little obstruction to the overall airflow as possible. It has been found that the curvilinear shape of the deflector 146 does not objectionably block airflow between the lower inner wall 144 and the outermost lower vane 142 when the plurality of horizontal vanes 110 are in the intermediate neutral positions, as shown in FIG. 5A.

Figure 9:
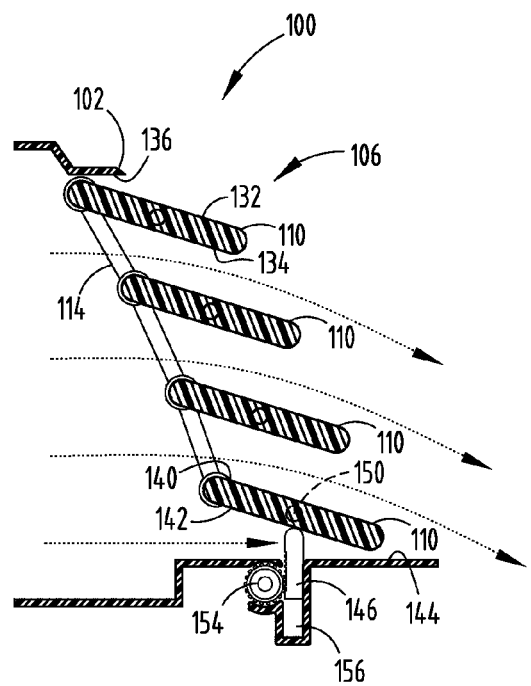
FIG. 9 is a cross-sectional view of a second embodiment of the heating, ventilation, and air conditioning register of the present disclosure.
Figure 9A:
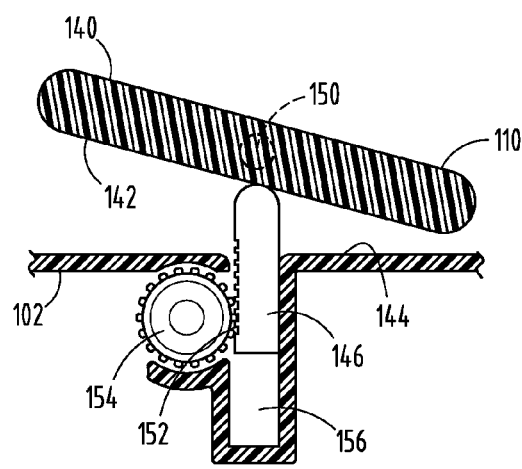
FIG. 9A is an enlarged cross-sectional view of the second embodiment of the heating, ventilation, and air conditioning register of the present disclosure in the extreme downward position.
Figure 9B:
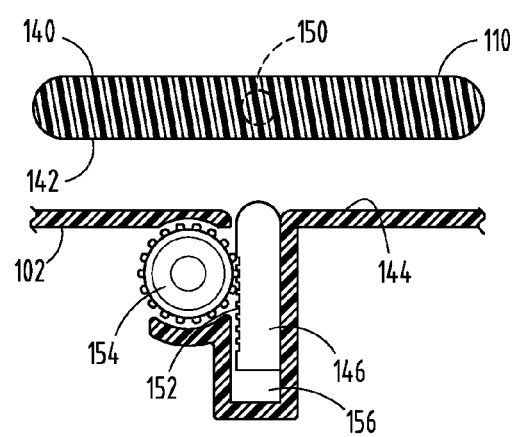
FIG. 9B is an enlarged cross-sectional view of the second embodiment of the heating, ventilation, and air conditioning register of the present disclosure in the neutral position.

Alternatively, the deflector 146 can be mounted on the lower inner wall 144 along the pivot axis 148 of the outermost lower vane 142, such that the deflector 146 extends upwardly proximate with the lower surface 142 of the outermost lower vane 138, as shown in FIGS. 9, 9A and 9B. This alternative embodiment likewise substantially blocks airflow between the inner housing wall 146 and the lower surface 142 of the outermost vane 110 in the extreme downward position, without interfering with the range of motion of the outermost lower vane 110, so that the overall downward momentum of the airflow exiting the register 110 is not significantly reduced.

Additionally, in the alternative embodiment where the deflector 146 is mounted on the lower inner wall 144, the deflector 146 may be movably disposed on the inner wall and moved to extend into the housing 102 only when the outermost lower vane 142 is moved to the extreme downward position, such as via a rack 152 and gear 154, cam, or other drive mechanism. This could further include, for example, a recess 156 in the lower inner wall 144, wherein the deflector 146 is retracted within the recess 156 when the outermost lower vane 142 is moved to an intermediate neutral position or to the extreme upward position, as shown in FIG. 9B. Thus, the airflow between the outermost lower vane 110 and the lower inner wall 144 would only be blocked in one of the two extreme aimed positions, and not in the intermediate neutral positions.

Of course, depending on the specific configuration of the register 100 and the orientation of the horizontal vanes relative the outlet 106, a similar deflector 146 may be employed to block any substantially un-deflected airflow that might flow between the upper surface 132 of the outermost upper vane 110 and the upper inner wall 136. Similarly, the register 100 configuration might call for a deflector 146 that might be beneficially employed on one or both of the outermost vanes of the plurality of vertical vanes 112 between the respective outermost vertical vane 112 and the vertical inner walls 118, 120.

Preferably, the outermost vane is prevented from physically contact or "bottoming out" against the inner wall of the housing to block the flow. Such physical contact has been found to cause mechanical issues, such as noise, and can be difficult to control in light of component tolerance "stack up."

By using the deflector 100 of the present disclosure, depending on the design of the dashboard 108, the outermost vane 110 interacts with the deflector to minimize the gap between the outermost vane and in the inner wall of the register housing when the vane is deflected toward the inner wall. This effectively prevents airflow from passing between the outer surface of outermost vane and the inner wall of the register.

The heating, ventilation, and air conditioning register 100 as outlined in detail above provides a register 100 equipped with vanes 110 that may be adjusted side-to-side and up and down to direct the airflow as desired by the vehicle occupants. Airflow through the register 100, particularly in the extreme downward direction, is not compromised by nominal airflow in the straight ahead direction. Rather, all airflow exiting the register is co-linear, where the momentum of the entire air stream is directed in the same direction. Thus, register efficiency is improved, along with the ability to aim the airflow in the extreme positions of the vanes, in comparison with traditional registers 100.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An air vent comprising:
    a hollow housing having an inlet, an outlet, and an inner housing wall;
    a plurality of pivotable vanes disposed proximate the outlet, each vane having a leading edge and a trailing edge between which extend substantially planar and parallel upper and lower surfaces and a pivot axis between the leading edge and the trailing edge, including an outermost vane disposed proximate the inner housing wall and an adjacent vane adjacent to the outermost vane, each of the outermost vane and adjacent vanes pivotable to an extreme position; and
    a deflector disposed between the inner housing wall and the outermost vane, the deflector extending downwardly from the lower surface of the outermost vane between the leading edge and trailing edge and toward the inlet, wherein airflow between the inner housing wall and the outermost vane is substantially blocked in the extreme position and airflow between the outermost vane and the adjacent vane is uninterrupted in the extreme position.

2. The air vent of claim 1, wherein the plurality of vanes are cooperatively coupled to each other to selectively direct airflow through the hollow housing, and each of the plurality of vanes are pivotable in unison between an extreme upward position to direct airflow upwardly, an extreme downward position to direct airflow downwardly, and intermediate neutral positions.

3. The air vent of claim 1, wherein the outermost vane is rotatable between a first extreme position, a second extreme position, and a plurality of neutral positions between the first and second extreme positions, and wherein the deflector does not substantially block airflow between the inner wall and the outermost vane in the neutral positions.

4. The air vent of claim 1, wherein each vane pivots about a pivot axis extending longitudinally along the width of the vane.

5. The air vent of claim 4, wherein the deflector is disposed on the lower surface of the outermost vane longitudinally along the pivot axis of the outermost vane and extends toward the inner housing wall.

6. The air vent of claim 5, wherein the deflector has a curvilinear cross section.

7. The air vent of claim 1, wherein the deflector and the inner housing wall are separated at all times.

8. An automotive air register comprising:
    a housing having an inlet, an outlet, and an inner wall;
    a plurality of vanes each having a leading edge and a trailing edge between which extend substantially planar and parallel upper and lower surfaces pivotably disposed within the outlet and a pivot axis between the leading edge and the trailing edge, including an outermost vane disposed proximate the inner housing wall and an adjacent vane adjacent to the outermost vane, each of the outermost vane and adjacent vanes having a downward position; and
    a deflector extending toward the inlet and downwardly between the leading edge and trailing edge from the outermost vane substantially blocking airflow between the inner wall and the outermost vane in the downward position, while airflow between the outermost vane and the adjacent vane is uninterrupted in the downward position.

9. The air register of claim 8, wherein the plurality of vanes are cooperatively coupled to each other to selectively direct airflow through the housing, and each of the plurality of vanes are pivotable in unison between an extreme upward position to direct airflow upwardly, an extreme downward position to direct airflow downwardly, and intermediate neutral positions, and wherein the deflector does not substantially block airflow between the inner wall and the outermost vane in the intermediate neutral positions.

10. The air register of claim 9, further comprising a second plurality of vanes cooperatively coupled to each other to selectively direct airflow through the housing, wherein each of the second plurality of vanes is pivotable in unison between an extreme rightward position to direct airflow rightwardly, an extreme leftward position to direct airflow leftwardly, and intermediate neutral positions.

11. The air register of claim 8, wherein each vane pivots about a pivot axis extending longitudinally along the width of the vane and the deflector is disposed on the lower surface of the outermost vane longitudinally along the pivot axis of the outermost vane and extends toward the inner wall.

12. The air register of claim 8, wherein the housing has a rectangular opening and wherein the outermost vane pivots about a pivot axis extending longitudinally along the width of the vane, and
    the deflector further comprises a curvilinear protuberance disposed on the lower surface of the outermost vane longitudinally along the pivot axis of the outermost vane extending toward the inner wall.

13. A method of directing airflow through a housing having an inlet, an outlet, and an inner wall comprising:
    disposing a plurality of vanes each having a leading edge and a trailing edge between which extend substantially planar and parallel upper and lower surfaces pivotably at the outlet and a pivot axis between the leading edge and the trailing edge, including an outermost vane disposed proximate the inner wall and an adjacent vane adjacent to the outermost vane, each of the outermost vane and adjacent vane having an extreme position; and positioning a deflector extending toward the inlet and downwardly between the leading edge and trailing edge from the lower surface of the outermost vane between the inner wall and the outermost vane to substantially block airflow between the inner wall and the outermost vane in the extreme position, while airflow between the outermost vane and the adjacent vane is uninterrupted in the extreme position.

14. The method of claim 13, wherein the outermost vane has substantially parallel upper and lower surfaces and pivots about a pivot axis extending longitudinally along the width of the vane, further comprising the step of disposing the deflector as a curvilinear protuberance on the lower surface of the outermost vane longitudinally along the pivot axis of the outermost vane extending toward the inner wall.

15. The method of claim 13, further comprising the steps of:

cooperatively coupling the plurality of vanes to each other to selectively direct airflow through the hollow housing; and pivoting each of the plurality of vanes in unison between an extreme upward position to direct airflow upwardly, an extreme downward position to direct airflow downwardly, and intermediate neutral positions, wherein the deflector does not substantially block airflow between the inner wall and the outermost vane in the intermediate neutral positions.

16. The method of claim 15, further comprising the step of separating the deflector and the inner housing wall at all times.

* * * * *